Aug. 15, 1933.　　　　W. O. HUNTER　　　　1,922,295
INSIDE GLARE SHIELD
Original Filed Sept. 7, 1927
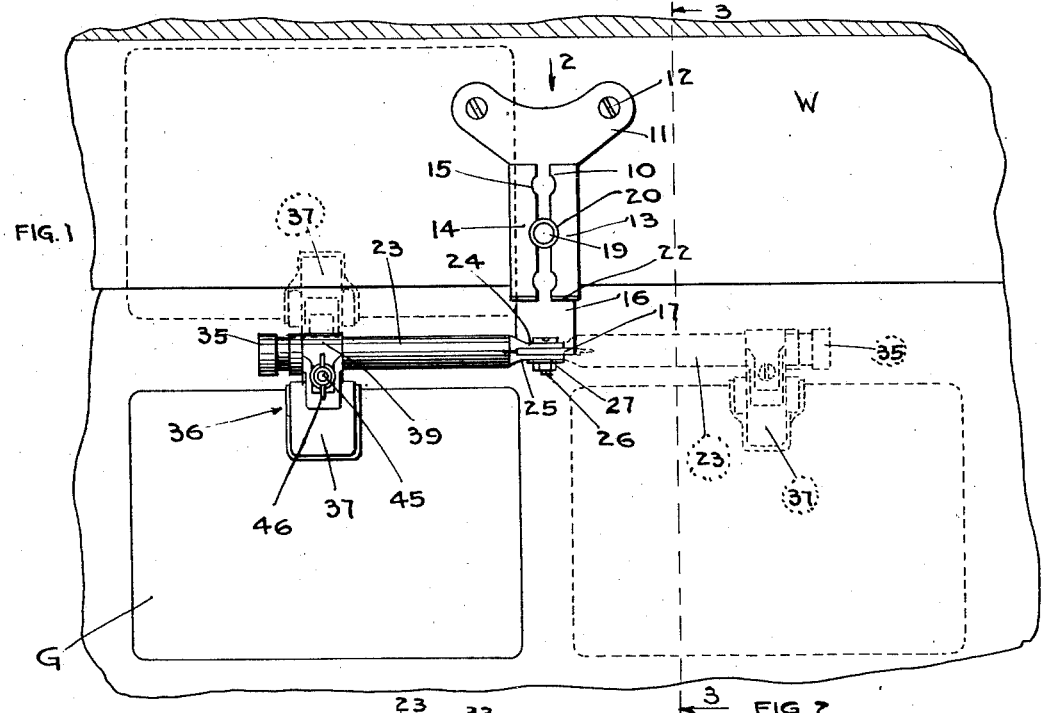
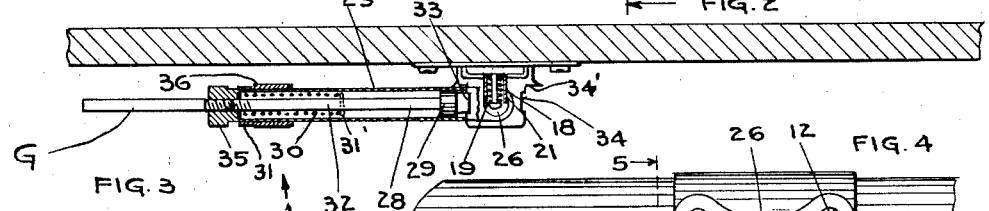
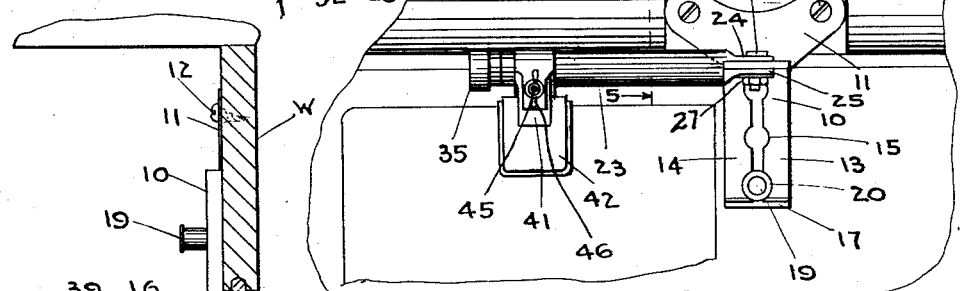
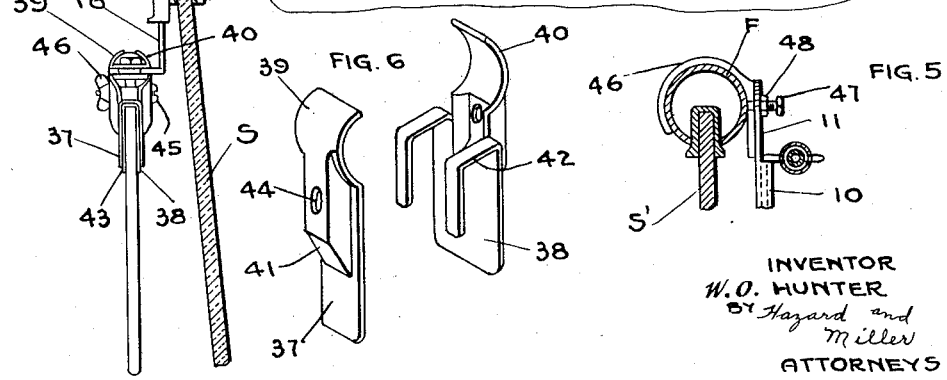
INVENTOR
W. O. HUNTER
BY Hazard and
Miller
ATTORNEYS Patented Aug. 15, 1933

1,922,295

UNITED STATES PATENT OFFICE 1,922,295

INSIDE GLARE SHIELD

William O. Hunter, Riverside, Calif.

Application September 7, 1927, Serial No. 218,035
Renewed November 7, 1932

5 Claims. (Cl. 296—97)

This invention relates to improvements in glare shields for vehicles and the like.

An object of the invention is to provide an improved glare shield attachable to a supporting construction on a vehicle which has several adjustments enabling the section of semi-transparent material constituting the glare shield to be adjusted in either of several directions so as to be properly positioned to prevent glare from the sun or bright lights from reaching the driver's eyes.

Another object of the invention is to provide an improved glare shield in which several of the parts may be used when the construction is mounted upon either an automobile of the closed car type such as a sedan, or upon an open car such as a touring car or roadster. In applying the mentioned parts to either of these types of vehicles it is merely necessary to change the form of the securing bracket in order to allow the parts to be used so that the glare shield will assume the proper position.

A further object of the invention is to provide a novel glare shield for vehicles which is of cheap, simple and durable construction, and which is not apt to get out of order easily.

With the foregoing and other objects in view which will be made manifest in the following detailed description and specifically pointed out in the appended claims, reference is had to the accompanying drawing for an illustrative embodiment of the invention.

Figure 1 is a partial view in elevation of the interior of a vehicle of the closed car type illustrating the improved glare shield positioned therein, various positions which the shield is adapted to assume, being illustrated by dotted lines.

Fig. 2 is a view taken in the direction of the arrow 2 upon Figure 1, the parts being broken away and shown in horizontal section.

Fig. 3 is a vertical section taken substantially upon the line 3—3 upon Figure 1.

Fig. 4 is a partial view in elevation illustrating the improved glare shield as applied to a vehicle of the open car type.

Fig. 5 is a vertical section taken upon the line 5—5 upon Figure 4.

Fig. 6 is a perspective view of the clamp which fastens the section of semi-transparent material to the arm of the glare shield.

Referring to the accompanying drawing wherein similar reference characters designate similar parts throughout, the improved glare shield as illustrated in Figures 1 to 3 inclusive, consists of a securing bracket having a body portion 10, the upper end of which is bifurcated to form ears 11 adapted to receive screws 12 for mounting it upon the inside of the wall W of a vehicle which connects the top of the vehicle with the windshield S. The sides of the body 10 are bent forwardly and then toward each other, providing spaced wings 13 and 14 having opposed edges which are spaced apart and which are notched as indicated at 15. These wings cooperate with the body portion 10 to form a guide which slidably receives a support 16 having an outstanding ear 17 on its lower end. A rivet 18 is fastened to the support 16 having a countersunk head thereon and slidable upon this rivet is a button 19 which is cup-shaped in form having a small flange 20 to facilitate its being grasped and pulled outwardly. A coil spring 21 is compressed between the head of the rivet 18 and the bottom of the cup and serves to urge the button toward the support 16. The button is of such a size that it is just capable of entering the notches 15 in the opposed edges of the wings 13 and 14, and when fitting in these notches the button prevents the downward or upward movement of the support 16 relatively to the securing bracket. By pulling the button outwardly against the action of the spring 21, the support 16 can be caused to slide either upwardly or downwardly for purposes of adjustment, and the button 19 can then be allowed to enter a different pair of notches 15. The lower edges of the wings 13 and 14 are bent outwardly forming flanges 22 which serve as stops limiting the downward movement of the button 19 so that the support 16 can not be allowed to slide out of the bracket through inadvertence. However, it is possible to remove the support 16 from the bracket by pulling the button outwardly with excessive force. A tubular arm 23 is provided which has a cylindrical exterior surface. This arm has one end flattened and bifurcated to form two ears 24 and 25 which are positioned above and below respectively, the ear 17. A bolt 26 passes through the ears 17, 24 and 25 and is tightened by a nut 27 serving to pivotally secure the arm 23 to the support 16. Within the arm 23 there is a plunger 28 having a shoulder 29 fitting within the arm and acting as a guide. The swinging end of the arm is closed such as by a cap 31 through which a stem 32 of the plunger is slidable. The interior surface of the cap 31 forms a spring seat for a coil spring 30 which is compressed between the cap and a pin 31′ or its equivalent which extends through the stem 32 intermediate its ends. The coil spring 30 serves to urge the plunger toward the ear 17, and one end of the plunger is reduced to form a pin 33 of such size that it will enter either of the notches 34 formed upon the peripheral surface of the ear. On the forward side of each notch there is formed a large shoulder 34' which is engageable by the arm 23, serving to limit the forward movement of the arm so that the arm can not swing into engagement with the windshield S. The outer end of the stem 32 of the plunger 28 is threaded and extends beyond the end of the arm 23 a short distance so as to receive a thumb nut 35 adapted to engage the end of the arm. By rotating the thumb nut, the plunger 28 can be drawn outwardly against the action of the coil spring 30 so as to remove the pin 33 from engagement with a notch 34. It will be held in such position by the nut having been screwed down on the stem 32 and engaging the closed end of the arm or cap 31. This keeps the plunger back within the arm so that the arm is free to swing about the bolt 26. If it is merely desired to shift the arm from the position shown in Figure 1 to the dotted line position shown in this figure, the thumb nut 35 instead of being screwed down on the stem, is merely pulled outwardly drawing the pin 33 out of the notch 34 against the action of the spring 30. The arm can then be swung into the desired position and the thumb nut released so that the spring 30 causes the pin 33 to enter the other notch 34. It will be appreciated that when the pin 33 is within a notch 34 that it effectively locks the arm in adjusted position.

Supported upon the arm 23 is a glare shield G formed of a section of semi-transparent material such as colored or stained glass or its equivalent. Any suitable material can be used for this purpose which will permit an image to be seen therethrough, but which cuts off glaring rays of light. The glare shield G is fastened to the arm 23 by means of a clamp generally designated at 36. The clamp is formed of two complementary parts having depending body portions 37 and 38 and formed on their upper ends with jaws 39 and 40 which are semi-cylindrical in form complementary to the external cylindrical surface on the arm 23. The body portions of the two parts forming the clamp are pressed outwardly as indicated at 41 to strengthen and stiffen them. One of the parts of the clamp is provided with angular fingers 42 which co-operate with the body portion of that part of the clamp to clamp upon and hold the upper edge of the glare shield G. A section of rubber, felt or the like indicated at 43, may be positioned over the edge of the glare shield G and the fingers 42 pressed toward the body portion 38, thus permanently fastening the glare shield to the body portion 38. The fingers 42 are so spaced that the body portion 37 will just fit between them. In the body portions there are formed aligned apertures 44 to receive a bolt 45 which may be tightened by means of a wing or thumb nut 46 which will draw the jaws 39 and 40 together so as to clamp upon the arm 23. By loosening the wing or thumb nut the glare shield and the clamp can be caused to slide or rotate on the arm 23. By reason of the fact that the fingers 42 permanently fasten the glare shields to one clamping part only, the glare shield G will not drop out of the clamp when the clamp is loosened. Furthermore, as the fingers 42 are spaced and engage the side edges of the body portion 37, the glare shield G can not be tipped while the clamp is being adjusted. As the jaws 39 and 40 are semi-cylindrical, the glare shield can be swung from the solid line position shown in Figure 1, to the uppermost dotted line position so that the shield will be out of the way when not in use.

From the above described construction it is apparent that three different adjustments are provided on the improved glare shield, one of which is vertical, another horizontal and a third providing a sliding and rotational adjustment. It will be noted that the support 16 is effectively locked in adjusted position on the securing bracket, and in a similar manner the arm 23 is locked in position on the ear 17. Frictional engagement is not depended upon to hold the support and arm in adjusted position as when a frictional engagement is employed the parts are very apt to loosen during vibration and must be returned to their adjusted position frequently. By locking the parts in adjusted position the vibration will not cause the parts to loosen and to move from their adjusted positions.

In Figures 4 and 5, the improved glare shield is illustrated as having been mounted upon an automobile of the open car type. To accomplish this a hook 46 is provided which is approximately semi-cylindrical in form with one end extending over the frame F which encloses the wind shield S'. This end preferably extends downwardly on the forward side of the frame to a point below its horizontal diameter. It has apertures therein which are threaded and which are adapted to be aligned with the apertures in the ears 11 which receive the screws 12. In mounting the improved glare shield upon this type of automobile, screws 47 are extended through the apertures in the ears 11 on the securing bracket, and are threaded into apertures in the hook 46 and tightened against the rear side of the frame F, thus firmly fastening the hook to the frame. Lock nuts 48 are threaded onto the screws 47 and are then tightened against the ears 11 so as to firmly fasten the ears to the hook. When the device is applied to an automobile of this type the support 16 is removed from the securing bracket by slipping the button 19 over the flanges 22, and is then caused to assume an inverted position as shown in Figures 4 and 5. The purpose of this is to have the arm 23 located at a higher elevation so as to properly position the glare shield G with respect to the top of the windshield.

From the above described construction it will be appreciated that a novel glare shield is provided which has several adjustments and which has its parts so constructed that it may be applied to both types of automobiles, namely, the closed car type or the open car type and that in applying it to either type of vehicle the glare shield may be caused to assume a proper position with respect to the top of the windshield. By varying the adjustment, the glare shield can be positioned between the eyes of the driver and the source of glare very easily.

It will be understood that various changes in the details of construction may be made without departing from the spirit or scope of the invention as defined by the appended claims.

I claim:

1. A glare shield comprising a support having an outstanding ear, an arm pivotally connected to the ear, a spring actuated plunger carried by the arm adapted to engage notches upon the ear to hold the arm in adjusted position with respect to the support, means for holding said plunger disengaged from the ear, and a section of semi-transparent material mounted upon said arm.

2. A glare shield comprising a support having an outstanding ear thereon, a hollow arm having ears positioned respectively above and below said ear and pivoted thereto, a spring actuated plunger disposed within the arm and adapted to engage notches upon the first mentioned ear to hold the arm in adjusted position, said plunger having a threaded stem extending beyond an end thereof, a nut threaded onto said stem permitting the plunger to be held thereby out of engagement with the notches, and a section of semi-transparent material mounted upon said arm.

3. A glare shield for vehicles, comprising a stationary part adapted to be mounted upon a vehicle, a movable part vertically adjustable thereon, an arm part rotatably adjustable on the movable part, there being locking connections between the three parts, each locking connection comprising spring actuated means on one part adapted to enter recesses in the other, so as to lock the parts in adjusted position, and a glare shield mounted upon said arm part.

4. A glare shield for vehicles, comprising a stationary part adapted to be mounted upon a vehicle, a movable part vertically adjustable thereon, an arm part rotatably adjustable on the movable part, there being locking connections between the three parts, each locking connection comprising means on one part adapted to enter recesses in the other, so as to lock the parts in adjusted position, and a glare shield mounted upon said arm part, and manually operable means for withdrawing the locking means from a recess to permanent adjustment.

5. A glare shield device comprising in combination an elongated support adapted to be mounted on an automobile, said support having a plurality of notches formed thereon along its length, a member slidable upon the support, spring actuated means adapted to be selectively caused to engage any of said notches to releasably lock the sliding member in adjusted position along the length of said support, said sliding member having an outstanding horizontal ear with notches formed therein, an arm pivoted to the ear for swinging movement in a horizontal plane, spring actuated means on the arm adapted to selectively engage the notches on the ear to lock the arm in adjusted position, and a glare shield adjustably mounted upon the arm.

WILLIAM O. HUNTER.